United States Patent
Denis

(10) Patent No.: US 10,906,119 B2
(45) Date of Patent: Feb. 2, 2021

(54) SYSTEMS AND METHODS FOR COMMUNICATION VIA A WELDING CABLE

(71) Applicant: ILLINOIS TOOL WORKS INC., Glenview, IL (US)

(72) Inventor: Marc Lee Denis, Lena, WI (US)

(73) Assignee: Illinois Tool Works Inc., Glenview, IL (US)

( * ) Notice: Subject to any disclaimer, the term of this patent is extended or adjusted under 35 U.S.C. 154(b) by 220 days.

(21) Appl. No.: 14/575,777

(22) Filed: Dec. 18, 2014

(65) Prior Publication Data

US 2016/0175974 A1 Jun. 23, 2016

(51) Int. Cl.
*B23K 9/12* (2006.01)
*B23K 9/10* (2006.01)
(Continued)

(52) U.S. Cl.
CPC ............ *B23K 9/125* (2013.01); *B23K 9/1087* (2013.01); *B23K 9/28* (2013.01); *H04B 3/54* (2013.01)

(58) Field of Classification Search
CPC ............ B23K 2201/32; B23K 2201/34; B23K 2203/22; B23K 9/173; B23K 11/24;
(Continued)

(56) References Cited

U.S. PATENT DOCUMENTS 2,043,331 A 6/1936 Notvest
2,175,891 A 10/1939 Graham
(Continued)

FOREIGN PATENT DOCUMENTS

EP 0575082 12/1993
EP 1586403 10/2005
(Continued)

OTHER PUBLICATIONS

Echelon, "PL 3120 / PL 3150 Power Line Smart Transceiver Data Book," Version 2, 005-0154-01C.
(Continued)

*Primary Examiner* — Tu B Hoang
*Assistant Examiner* — Vy T Nguyen
(74) *Attorney, Agent, or Firm* — McAndrews, Held & Malloy, Ltd.

(57) ABSTRACT

A welding system having a weld torch, a first transmitting circuit, and a first receiving circuit is provided. The weld torch is coupled to a weld cable and is configured for a welding application. The first transmitting circuit includes a first processor and a sensor system with at least one sensor configured to detect sensor information related to the weld torch. The first processor transmits one or more control signals based on the received sensor information. The first receiving circuit includes communications circuitry and a second processor that receives the one or more control signals and generates information related to a trigger status based on the one or more control signals. The communications circuitry transmits the information to the wire feeder, and the wire feeder controls an operating parameter of the welding system based at least in part on the information related to the trigger status.

16 Claims, 3 Drawing Sheets

(51) Int. Cl.
*H04B 3/54* (2006.01)
*B23K 9/28* (2006.01)

(58) Field of Classification Search
CPC .......... B23K 9/321; B23K 9/323; C25D 3/58;
C25D 7/0607; G01M 99/00; H01R 13/46;
H01R 13/502; H01R 13/5812; H02G
15/007; H02G 15/06; H02G 15/113;
H02G 3/0616; H02G 3/0633; H02G
3/0683
USPC ................ 219/137, 136, 108, 132; 434/234;
375/227, 360
See application file for complete search history.

(56) References Cited

U.S. PATENT DOCUMENTS

| | | |
|---|---|---|
| 2,526,597 A | 10/1950 | Winslow |
| 2,617,913 A | 11/1952 | Oestreicher |
| 2,642,515 A | 6/1953 | Bagg |
| 3,496,328 A | 2/1970 | Moerke |
| 3,992,565 A | 11/1976 | Gatfield |
| 4,051,344 A | 9/1977 | Robbins |
| 4,079,231 A | 3/1978 | Toth |
| 4,147,919 A | 4/1979 | Matasovic |
| 4,216,367 A | 8/1980 | Risberg |
| 4,216,368 A | 8/1980 | Delay |
| 4,227,066 A | 10/1980 | Bulwidas |
| 4,247,752 A | 1/1981 | Stringer |
| 4,266,114 A | 5/1981 | Hansen |
| 4,410,789 A | 10/1983 | Story |
| 4,450,340 A | 5/1984 | Corrigall |
| 4,467,174 A | 8/1984 | Gilliland |
| 4,508,954 A | 4/1985 | Kroll |
| 4,521,672 A | 6/1985 | Fronius |
| 4,531,045 A | 7/1985 | Kemp |
| 4,561,059 A | 12/1985 | Davis |
| 4,584,685 A | 4/1986 | Gajjar |
| 4,608,482 A | 8/1986 | Cox |
| 4,641,292 A | 2/1987 | Tunnell |
| 4,767,908 A | 8/1988 | Dallavalle |
| 4,769,754 A | 9/1988 | Reynolds |
| 4,918,517 A | 4/1990 | Burgoon |
| 4,973,821 A | 11/1990 | Martin |
| 5,039,835 A | 8/1991 | Schwiete |
| 5,043,557 A | 8/1991 | Tabata |
| 5,063,282 A | 11/1991 | Gilliland |
| 5,276,305 A | 1/1994 | Hsien |
| 5,376,894 A | 12/1994 | Petranovich |
| 5,406,050 A | 4/1995 | MacOmber |
| 5,559,377 A * | 9/1996 | Abraham ................ H04B 3/56 |
| | | 307/104 |
| 5,653,902 A | 8/1997 | Chang |
| 5,834,916 A | 11/1998 | Shimogama |
| 5,982,253 A | 11/1999 | Perrin |
| 6,040,555 A | 3/2000 | Tiller |
| 6,091,048 A | 7/2000 | Lanouette |
| 6,103,994 A | 8/2000 | Decoster |
| 6,156,999 A | 12/2000 | Ignatchenko |
| 6,166,506 A | 12/2000 | Pratt |
| 6,225,596 B1 | 5/2001 | Chandler |
| 6,423,936 B1 | 7/2002 | Reed |
| 6,458,157 B1 | 10/2002 | Suaning |
| 6,479,791 B1 | 11/2002 | Kowaleski |
| 6,479,795 B1 | 11/2002 | Albrecht |
| 6,570,132 B1 | 5/2003 | Brunner |
| 6,624,388 B1 | 9/2003 | Blankenship |
| 6,627,849 B2 | 9/2003 | Ihde |
| 6,653,597 B2 | 11/2003 | Baum |
| 6,710,927 B2 | 3/2004 | Richards |
| 6,781,095 B2 | 8/2004 | Hayes |
| 6,818,860 B1 | 11/2004 | Stava |
| 6,906,285 B2 | 6/2005 | Zucker |
| 6,909,285 B2 | 6/2005 | Jordan |
| 7,205,503 B2 | 4/2007 | Reynolds |
| 8,345,819 B2 | 1/2013 | Mastronardi |
| 2001/0043656 A1 | 11/2001 | Koslar |
| 2003/0089693 A1 | 5/2003 | Hayes |
| 2004/0026392 A1* | 2/2004 | Feichtinger ............ B23K 9/095 |
| | | 219/130.5 |
| 2004/0199846 A1 | 10/2004 | Matsumoto |
| 2005/0087523 A1 | 4/2005 | Zucker |
| 2006/0027546 A1 | 2/2006 | Reynolds |
| 2006/0076335 A1 | 4/2006 | Reynolds |
| 2006/0086706 A1 | 4/2006 | Ulrich |
| 2006/0138113 A1 | 6/2006 | Ott |
| 2007/0080154 A1 | 4/2007 | Ott |
| 2007/0114216 A1 | 5/2007 | Ott |
| 2009/0298024 A1* | 12/2009 | Batzler .................... B23K 9/32 |
| | | 434/234 |
| 2011/0069766 A1* | 3/2011 | Takahashi .............. H04B 3/548 |
| | | 375/257 |
| 2011/0073569 A1 | 3/2011 | Rappl |
| 2011/0220619 A1 | 9/2011 | Mehn |
| 2012/0076212 A1 | 3/2012 | Zeppetelle |
| 2012/0097644 A1* | 4/2012 | Ott ........................ B23K 9/124 |
| | | 219/108 |
| 2013/0186874 A1* | 7/2013 | Ihde ....................... B23K 9/323 |
| | | 219/137.63 |
| 2013/0299461 A1 | 11/2013 | Fisher et al. |
| 2013/0319987 A1* | 12/2013 | Beistle ................. B23K 9/1087 |
| | | 219/132 |
| 2014/0001169 A1 | 1/2014 | Enyedy |
| 2014/0069904 A1* | 3/2014 | Sammons ............ H01R 13/502 |
| | | 219/136 |
| 2014/0076872 A1 | 3/2014 | Ott |
| 2014/0263256 A1 | 9/2014 | Rappl |
| 2014/0269873 A1* | 9/2014 | Tahir ................... H04W 52/241 |
| | | 375/227 |
| 2015/0258621 A1 | 9/2015 | Ulrich |

FOREIGN PATENT DOCUMENTS

| | | |
|---|---|---|
| EP | 1748573 | 1/2007 |
| JP | S59193768 | 11/1984 |
| JP | 61137675 | 6/1986 |
| JP | 162966 | 6/1992 |
| JP | 4162964 | 6/1992 |
| JP | 04162964 | 6/1992 |
| JP | 04162966 | 6/1992 |
| JP | 05104248 | 2/1993 |
| JP | 2003088957 | 3/2003 |
| JP | 2003154455 | 5/2003 |
| JP | 2003191075 | 7/2003 |
| JP | 2003236663 | 8/2003 |
| WO | 2009149425 | 12/2009 |
| WO | 2011041037 | 4/2011 |
| WO | 2012058164 | 5/2012 |

OTHER PUBLICATIONS

Hackl et al., "Digitally Controlled GMA Power Sources," Fronius, www.fronius.com/worldwide/usa/products/paper_digitally_controlld_power_sources_gb.pdf, pp. 1-7, publication date not provided.

Intellon, "CEBus Power Line Encoding and Signaling," White Paper #0027, Mar. 1997, Version 0.1, pp. 1-6.

International Search Report from PCT application No. PCT/US2015/059642, dated Feb. 24, 2016, 12 pgs.

European Patent Office, Office Action dated Jul. 17, 2019, EP Application No. 15 797 540.0, 4 pages.

* cited by examiner

SYSTEMS AND METHODS FOR COMMUNICATION VIA A WELDING CABLE

BACKGROUND

The present disclosure relates generally to welding systems, and more particularly to systems and methods for weld cable communications.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas) is provided to the weld in an appropriate amount at the desired time. For example, metal inert gas (MIG) welding typically relies on a wire feeder to enable a welding wire to reach a welding torch. The wire is continuously fed during welding to provide filler metal. The MIG welding system may also include a welding power source that ensures that arc heating is available to melt the filler metal and the underlying base metal. In certain applications, the welding system may include power cables that supply power from the welding power source to a welding torch performing a welding application. For example, the welding power source may provide a welding voltage that may be utilized between the welding torch and a workpiece to perform the welding application.

To further enhance the operability of traditional welding systems, certain components of the welding systems, such as the welding torch and/or the wire feeder, are communicatively coupled to one another across one or more control cables in addition to a dedicated power cable (e.g., weld cable). For example, control signals defining the operational parameters of the welding torch may be transmitted or fed back to the wire feeder. Although control cables may provide useful communications between components of the welding system, the control cables are typically fragile relative to the welding cables designed to carry high currents at high voltages. Moreover, while many traditional welding operations can be performed on a horizontal surface, certain weld environments may require the weld operator to weld a workpiece in an "out of position" weld, such as in an overhead position located above the operator. In such applications, the operator may rotate the welding torch and any associated cables (e.g., the weld cable, the control cables) into the overhead position, thereby damaging the fragile control cables. Damage to the control cable may then cause damage to the wire feeder and/or the welding power source, which may result in downtime while equipment is replaced or fixed. Further, the appropriate control signals are not received or transmitted by each respective component, which may result in an efficient welding application.

BRIEF DESCRIPTION

Certain embodiments commensurate in scope with the originally claimed embodiments are summarized below. These embodiments are not intended to limit the scope of the claimed present disclosure, but rather these embodiments are intended only to provide a brief summary of possible forms of the present disclosure. Indeed, the present disclosure may encompass a variety of forms that may be similar to or different from the embodiments set forth below.

In one embodiment, a welding system is provided. The welding system includes a weld torch coupled to a weld cable and configured to output wire from a wire feeder and produce a welding arc based on the welding power received through the weld cable. The system includes a first transmitting circuit configured to be coupled to the weld cable proximate to the weld torch. The system also includes a sensor system coupled to the first transmitting circuit and comprising at least one sensor configured to detect sensor information related to a trigger status of the weld torch. The system also includes a first processor disposed within the first transmitting circuit and configured to receive the sensor information and to transmit one or more control signals based on the sensor information, and a first receiving circuit configured to be coupled to the weld cable proximate to the wire feeder. The system also includes a second processor disposed within the first receiving circuit and configured to receive the one or more control signals from the first transmitting circuit and to generate information related to the trigger status of the weld torch based on the one or more control signals. The system also includes communications circuitry disposed within the first receiving circuit and configured to transmit the information related to the trigger status of the weld torch to the wire feeder, wherein the wire feeder is configured to control an operating parameter of the welding system based at least in part on the information related to the trigger status.

In another embodiment a system for communicating between at least two components of a welding system. The system includes a transmitter circuit configured to be disposed within a weld torch, and the transmitter circuit includes a sensor system configured to detect sensor feedback information related to a trigger status of the weld torch. The transmitter circuit also includes a first processor configured to generate one or more control signals based on the sensor feedback received from the sensor system, and to transmit the one or more control signals through a weld cable configured to supply power to the weld torch. The system includes a receiver circuit configured to be disposed within a wire feeder, and the receiver circuit includes a second processor configured to receive the one or more control signals through the weld cable, and to determine the trigger status of the weld torch based on the one or more control signals. The receiver circuit also includes communications circuitry configured to transmit the trigger status to control circuitry disposed within the wire feeder, wherein the control circuitry is configured to control an operating parameter of the welding system based at least in part on the trigger status.

In another embodiment a method is provided. The method includes detecting, via a sensor system coupled to a transmitter circuit, sensor feedback information related to a trigger status of a weld torch within a welding system. The method also includes receiving the sensor feedback information from the sensor system at a first processor disposed within the transmitter circuit and generating one or more control signals based on the trigger status of the weld torch via the first processor. The method includes transmitting, via the first processor, the one or more control signals through a weld cable and receiving, via a second processor disposed within a receiver circuit, the one or more control signals transmitted from the first processor through the weld cable. The method also includes determining, via the second processor, information related to the trigger status of the weld torch based on the one or more control signals received through the weld cable. The method also includes transmitting, via communications circuitry disposed within the receiver circuit, the information related to the trigger status to the wire feeder, wherein the wire feeder is configured to control an operating parameter of the welding system based at least in part on the information related to the trigger status received from the receiver circuit.

DRAWINGS

These and other features, aspects, and advantages of the present present disclosure will become better understood when the following detailed description is read with reference to the accompanying drawings in which like characters represent like parts throughout the drawings, wherein.

Figure 1:
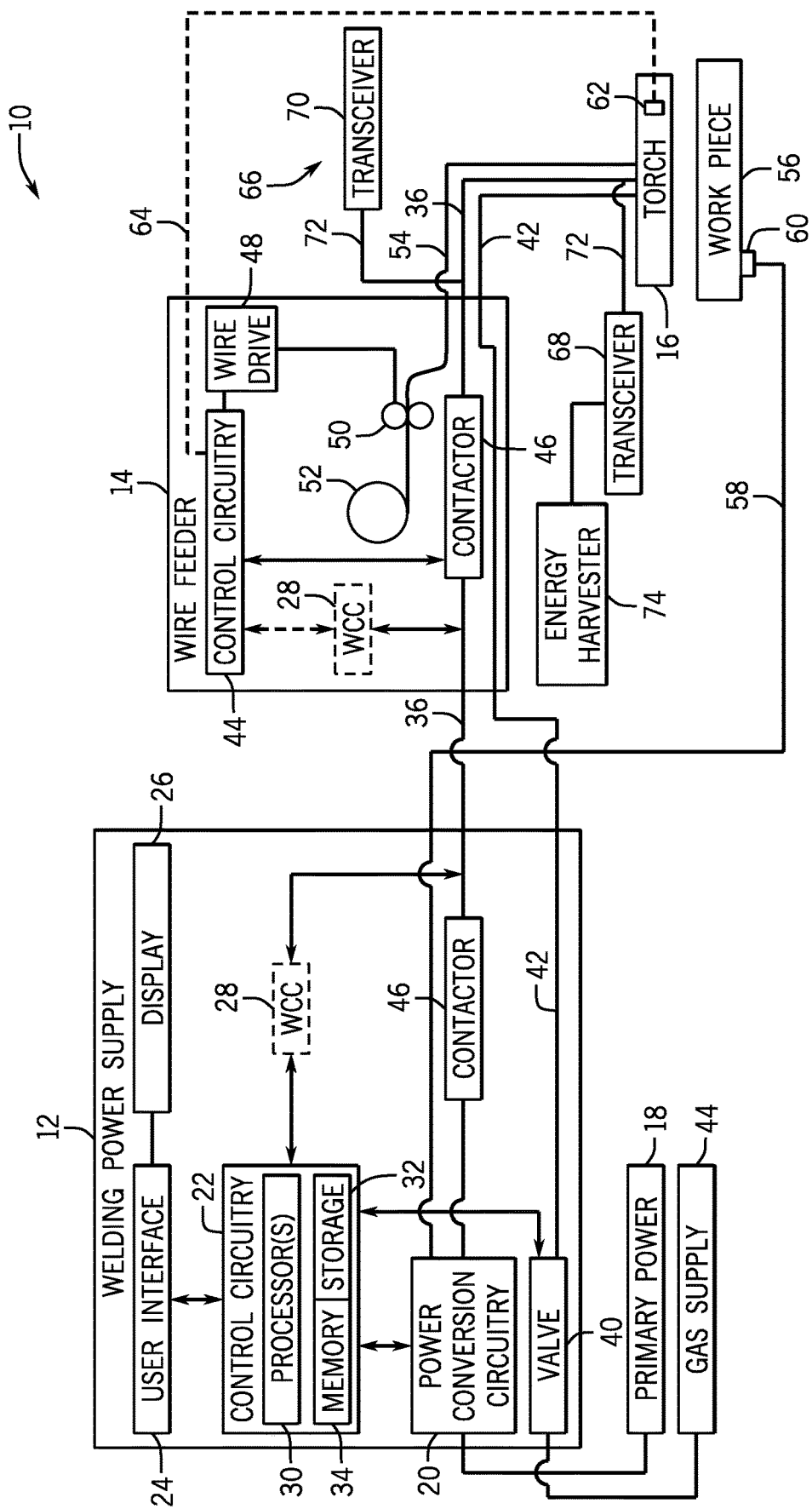
FIG. 1 is a block diagram of an embodiment of a welding system having one or more transceivers that are coupled to and communicate through a weld cable, in accordance with aspects of the present disclosure.
Figure 2:
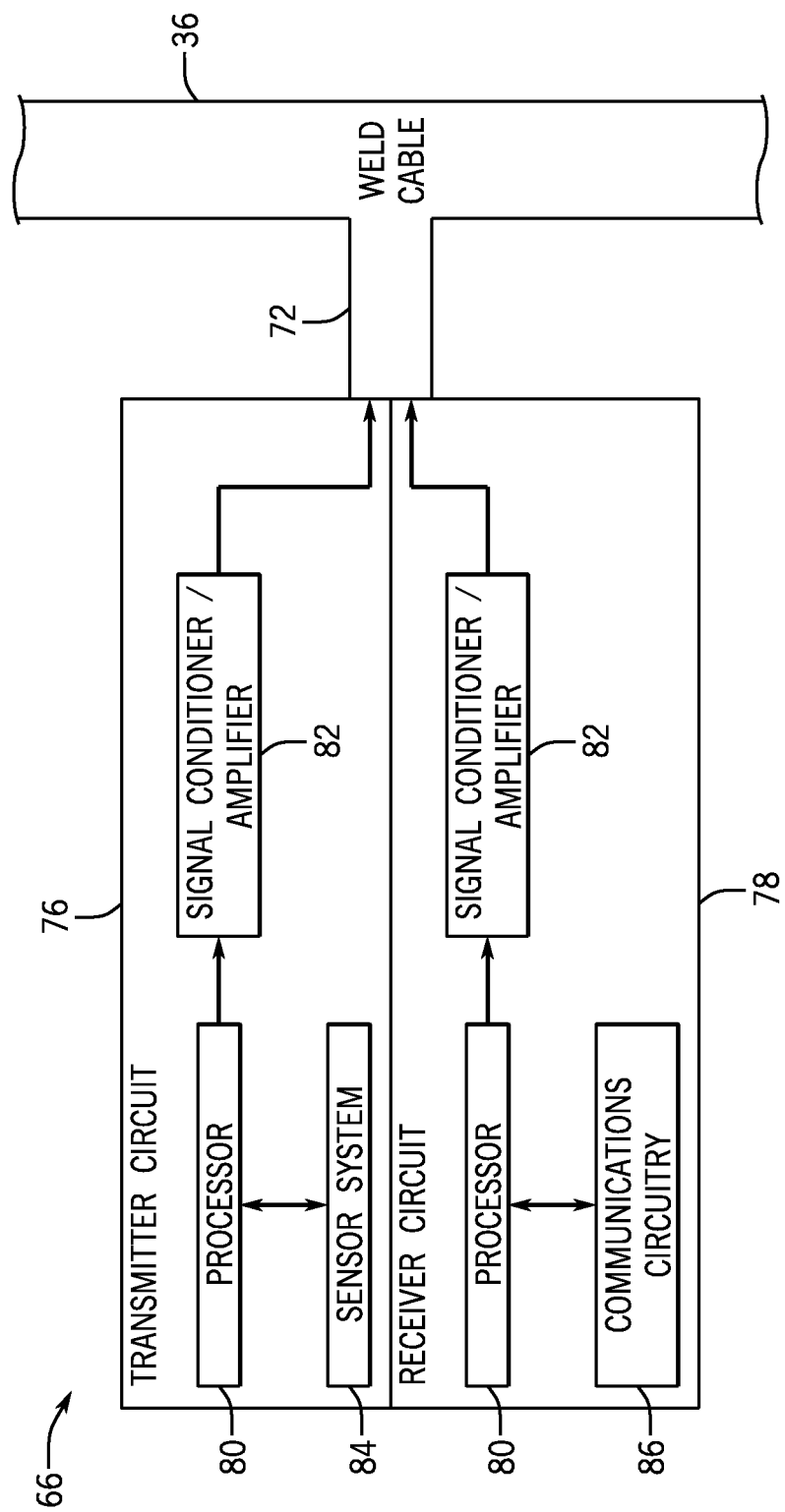
FIG. 2 illustrates a block diagram of a transceiver in the welding system of FIG. 1, in accordance with embodiments described herein.
Figure 3:
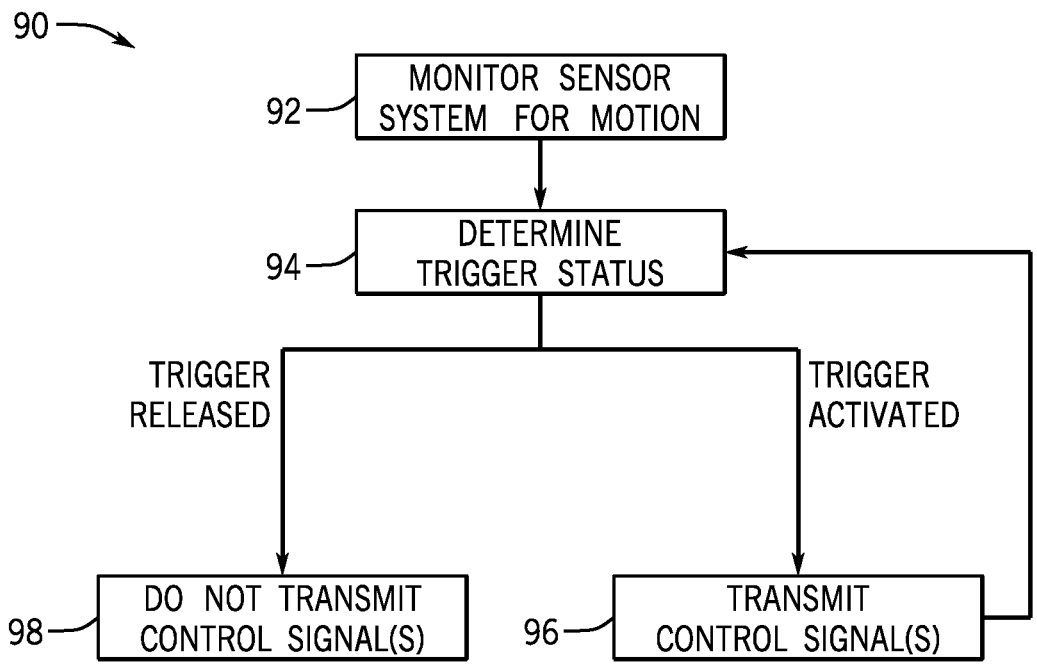
Figure 4:
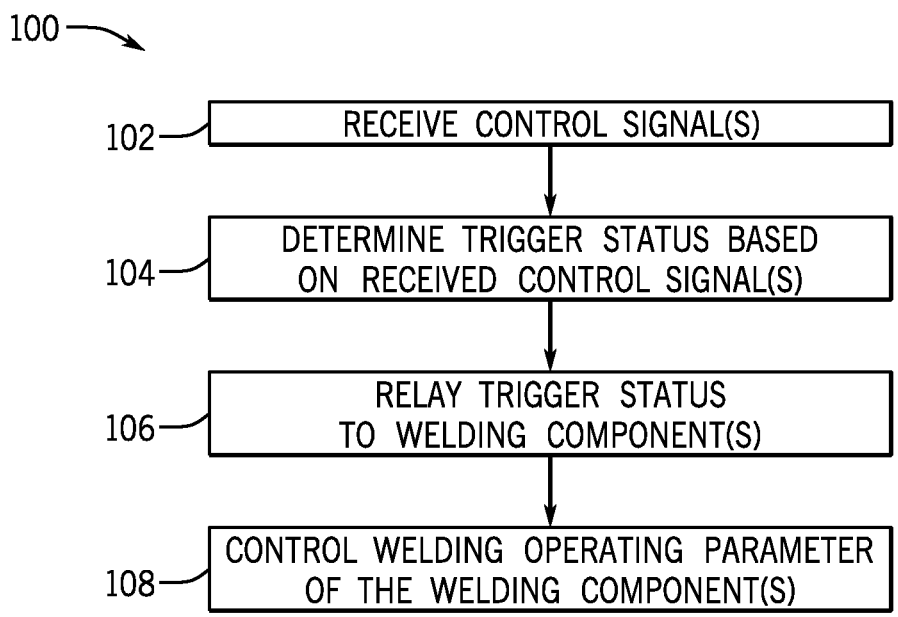

FIG. 3 illustrates a flow chart of a method for transmitting one or more control signals using a transmitter circuit of the transceiver of FIG. 2 based on an operating parameter of the welding system of FIG. 1, in accordance with embodiments described herein; and FIG. 4 illustrates a flow chart of a method for controlling an operating parameter of the welding system of FIG. 1 based on the one or more control signals received by a receiver circuit of the transceiver of FIG. 2, in accordance with embodiments described herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure generally relate to a welding system having a welding power supply, a wire feeder, a welding torch, and one or more transceivers. The welding power supply may include a weld cable configured to provide power to one or more components of the welding system, such as the wire feeder or the welding torch. For example, the weld cable may be configured to provide a welding voltage to the welding torch to perform a welding operation on a workpiece. In certain embodiments, the transceivers are configured to enable communications between one or more component(s) of a welding system via a weld cable. For example, in certain embodiments, the one or more transceivers may be disposed along and/or coupled to the weld cable and may be configured to send and receive control signals via the weld cable of the welding system. In certain embodiments, a transceiver may be disposed within weld communications circuitry of a component of the welding system, and may be configured to send and receive control signals via the weld cable to a transceiver disposed in a different location within the welding system.

For example, in certain embodiments, the transceiver may include a transmitter circuit and a receiver circuit. Further, a first transceiver may be disposed along the weld cable proximate to the welding torch while a second transceiver may be disposed along the weld cable proximate to a component of the welding system (e.g., wire feeder, welding power supply). The transmitter circuit of the first transceiver may receive data related to the welding torch, and may be configured to communicate one or more control signals to the second transceiver based on the received data. For example, the transmitter circuit may utilize the received data to generate one or more modulated or unmodulated tones and send these tones to the weld cable via a cable coupler. In addition, the receiver circuit of the second transceiver may be configured to receive the one or more control signals via a second cable coupler coupled to weld cable. The receiver circuit may then filter or condition the received tones and transform the control signals into a data stream (e.g., serial data) or the like. The data stream may then be provided to a component of the welding system (e.g., the wire feeder, the welding power supply) to control certain operations of a respective component, the entire welding system, and the like.

With the forgoing in mind, FIG. 1 is a block diagram of an embodiment of a welding system 10 having a welding power supply 12, a wire feeder 14, and a welding torch 16. The welding system 10 powers, controls, and supplies consumables to a welding application. In certain embodiments, the welding power source 12 directly supplies input power to the welding torch 16. The welding torch 16 may be a torch configured for stick welding, tungsten inert gas (TIG) welding, or gas metal arc welding (GMAW), based on the desired welding application. In the illustrated embodiment, the welding power source 12 is configured to supply power to the wire feeder 14, and the wire feeder 14 may be configured to route the input power to the welding torch 16. In addition to supplying an input power, the wire feeder 14 may supply a filler metal to a welding torch 14 for various welding applications (e.g., GMAW welding, flux core arc welding (FCAW)).

The welding power supply 12 receives primary power 18 (e.g., from the AC power grid, an engine/generator set, a battery, or other energy generating or storage devices, or a combination thereof), conditions the primary power, and provides an output power to one or more welding devices in accordance with demands of the system 10. The primary power 18 may be supplied from an offsite location (e.g., the primary power may originate from the power grid). Accordingly, the welding power supply 12 includes power conversion circuitry 20 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 20 may be configured to convert the primary power 18 to both weld and auxiliary power outputs. However, in other embodiments, the power conversion circuitry 20 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 22 to control the operation of the welding power supply 12. The welding power supply 12 also includes a user interface 24. The control circuitry 22 may receive input from the user interface 24 through which a user may choose a process and input desired parameters (e.g., voltages, currents, particular pulsed or non-pulsed welding regimes, and so forth). The user interface 24 may receive inputs using any input device, such as via a keypad, keyboard, buttons, touch screen, voice activation system, wireless device, etc. Furthermore, the control circuitry 22 may control operating parameters based on input by the user as well as based on other current operating parameters. Specifically, the user interface 24 may include a display 26 for presenting, showing, or indicating, information to an operator. The control circuitry 22 may also include interface circuitry for communicating data to other devices in the system 10, such as the wire feeder 14. For example, in some situations, the welding power supply 12 may wirelessly communicate with other welding devices within the welding system 10. Further, in some situations, the welding power supply 12 may communicate with other welding devices using a wired connection, such as by using a network interface controller (NIC) to communicate data via a network (e.g., the Internet). In particular, the control circuitry 22 may communicate and interact with weld cable communications (WCC) circuitry 28, as further described in detail below.

The control circuitry 22 includes at least one controller or processor 30 that controls the operations of the welding power supply 12, and may be configured to receive and process multiple inputs regarding the performance and demands of the system 10. Furthermore, the processor 30 may include one or more microprocessors, such as one or more "general-purpose" microprocessors, one or more special-purpose microprocessors and/or ASICS, or some combination thereof. For example, the processor 30 may include one or more reduced instruction set (RISC) processors.

The control circuitry 22 may include a storage device 32 and a memory device 34. The storage device 32 (e.g., nonvolatile storage) may include ROM, flash memory, a hard drive, or any other suitable optical, magnetic, or solid-state storage medium, or a combination thereof. The storage device 32 may store data (e.g., data corresponding to a welding application), instructions (e.g., software or firmware to perform welding processes), and any other suitable data. As may be appreciated, data that corresponds to a welding application may include an attitude (e.g., orientation) of a welding torch, a distance between the contact tip and a workpiece, a voltage, a current, welding device settings, and so forth.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor-executable instructions (e.g., firmware or software) for the processor 30 to execute. In addition, a variety of control regimes for various welding processes, along with associated settings and parameters, may be stored in the storage device 32 and/or memory device 34, along with code configured to provide a specific output (e.g., initiate wire feed, enable gas flow, capture welding current data, detect short circuit parameters, determine amount of spatter) during operation.

In certain embodiments, the welding power flows from the power conversion circuitry 20 through a weld cable 36 to the wire feeder 14 and the welding torch 16. Furthermore, in certain embodiments, welding data may be communicated via the weld cable 36 such that welding power and weld data are provided and transmitted together using a single conductor. In particular, the WCC circuitry 28 may be communicatively coupled to the weld cable 36 to communicate (e.g., send/receive) data over the weld cable 36. The WCC circuitry 28 may be implemented based on various types of power line communications methods and techniques. For example, the WCC circuitry 28 may utilize IEEE standard P1901.2 to provide welding power and data communications over the weld cable 36. In this manner, the weld cable 36 may be utilized to provide welding power from the welding power supply 12 to the wire feeder 14 and the welding torch 16. Furthermore, the weld cable 36 may also be utilized to transmit (and/or receive) data communications to the wire feeder 14 and the welding torch 16.

A gas supply 38 provides shielding gases, such as argon, helium, carbon dioxide, and so forth, depending upon the welding application. The shielding gas flows to a valve 40, which controls the flow of gas, and if desired, may be selected to allow for modulating or regulating the amount of gas supplied to a welding application. The valve 40 may be opened, closed, or otherwise operated by the control circuitry 22 to enable, inhibit, or control gas flow (e.g., shielding gas) through the valve 46. Shielding gas exits the valve 40 and flows through a hose 42 (which in some implementations may be packaged with the welding power output) to the wire feeder 14 which provides the shielding gas to the welding application. As may be appreciated, certain embodiments of the welding system 10 may not include the gas supply 38, the valve 40, and/or the hose 42.

In certain embodiments, the wire feeder 14 may use the welding power to power the various components in the wire feeder 14, such as to power control circuitry 44. As noted above, the weld cable 36 may be configured to provide or supply the welding power. The welding power supply 12 may also communicate with the wire feeder 14 using the cable 36 and the WCC circuitry 28. The control circuitry 44 controls the operations of the wire feeder 14.

A contactor 46 (e.g., high amperage relay) is controlled by the control circuitry 44 and configured to enable or inhibit welding power to continue to flow to the weld cable 36 for the welding application. In certain embodiments, the contactor 46 may be an electromechanical device, while in other embodiments the contactor 46 may be any other suitable device, such as a solid state device. Further, in certain embodiments, the welding power supply 12 may include the contactor 46 for substantially similar functions. The wire feeder 14 includes a wire drive 48 that receives control signals from the control circuit 44 to drive rollers 50 that rotate to pull wire off a spool 52 of wire. The wire is provided to the welding application through a wire cable 54. Likewise, the wire feeder 14 may provide the shielding gas through the hose 42. As may be appreciated, in certain embodiments, the cables 36, and 54 and the hose 42 may be bundled together or individually provided to the welding torch 16.

The welding torch 16 delivers the wire, welding power, and shielding gas for a welding application. The welding torch 16 is used to establish a welding arc between the welding torch 16 and a workpiece 56. A work cable 58, which may be terminated with a clamp 60 (or another power connecting device), couples the welding power supply 12 to the workpiece 56 to complete a welding power circuit.

In certain situations, when a trigger 62 (e.g., switch) on the welding torch 16 is actuated, the wire feeder 14 provides the welding wire through the cable 54 and the welding operation or the welding arc is initiated or reinitiated. Likewise, when the trigger 62 is released, the wire feeder 14 stops providing the welding wire through the cable 54 for the welding application. Generally, the control circuitry 44 may be configured to receive an indication from the welding torch 16 that indicates whether the trigger 62 of the welding torch 16 is actuated or released via one or more control wires 64. Based on this indication, the control circuitry 44 may control the operations of the wire feeder 14, such as enabling the wire drive 48 and/or the rollers 50. However, in certain welding applications, it may be cumbersome to have control wires 64 in addition to the cables 36, 54, and 58, the hose 42, and other wires and cables. Accordingly, in certain embodiments, the welding system 10 includes one or more transceivers 66 configured to communicate the operating parameters of components of the welding system 10, such as parameters of the welding torch 16, in order to obviate the need for the control wires 64.

For example, in certain embodiments, the welding system 10 includes a first transceiver 68 coupled to the weld cable 36 proximate to the welding torch 16 and a second transceiver 70 coupled to the weld cable 36 proximate to the wire feeder 14. For example, the first transceiver 68 may be disposed along the weld cable 36 closer to the welding torch 16 than the wire feeder 14. Likewise, the second transceiver 70 may be disposed along the weld cable 36 closer to the wire feeder 14 than the welding torch 16. In particular, the transceivers 66 may be coupled to the weld cable 36 via a cable coupler 72. The cable coupler 72 may be a mechanical clamp that attaches around a surface of the weld cable 36. For example, the cable coupler 72 may have an inner diameter that sufficiently matches the diameter of the outer diameter weld cable 36. The weld cable 36 may be associated with certain expected gauge cables and thus a different diameter cable coupler 72 may be constructed for each expected gauge cable. In one embodiment, the mechanical clamp may have an adjustable diameter to fit the around various sized weld cables 36.

In particular, the transceivers 66 may be configured to receive information related to a component of the welding system 10, and transmit a control signal based on the information received. Further, the transceivers 66 may be configured to interpret the control signal(s) received in order to transfer or relay information related to a component of the welding system 10 to another component of the welding system 10. For example, in the illustrated embodiment, the first transceiver 68 may receive data related to the welding torch 16. For example, the first transceiver 68 may be communicatively coupled with the trigger 62 and receive information related to the status of the trigger 62, such as if the trigger 62 is actuated or released. Further, the first transceiver 68 may be configured to communicate one or more control signals to the second transceiver 70. For example, the first transceiver 68 may utilize the received data to generate one or more control signals and send these control signals through the cable coupler 72 and to the weld cable 36. The cable coupler 72 may then, in turn, transfer the control signals to the weld cable 36. In addition, the second transceiver 70 may be configured to receive the one or more control signals via the cable coupler 72 coupled to the weld cable 36. The second transceiver 70 may then filter or condition the received control signals and transform the control signals into a data stream (e.g., serial data) or the like. The data stream may then be provided to the wire feeder 14 to control certain operations of the wire feeder 14, such as the wire drive 48. In this manner, the transceivers 66 may be configured to communicate the operating parameters of the welding torch 16 via the weld cable 36, thereby removing the need for the control wires 64.

It should be noted that in other embodiments, the transceivers 66 may be disposed within the WCC circuitry 28 of a component of the welding system 10 (e.g., the welding power supply 12, the wire feeder 14, the welding torch 16). Further, in certain embodiments, the welding system 10 includes an energy harvester 74 configured to generate energy to power the transceivers 66. In other embodiments, the transceivers 66 may utilize power provided by the welding power supply 12.

FIG. 2 illustrates a block diagram of a transceiver 66 in the welding system 10 of FIG. 1, in accordance with embodiments described herein. In certain embodiments, the transceivers 66 may be disposed along the length of the weld cable 36 between the wire feeder 14 and the welding torch 16 and/or within any component (e.g., the welding power supply 12, the wire feeder 14, the welding torch 16) of the welding system 10. In particular, the transceiver 66 includes a transmitter circuit 76 and a receiver circuit 78. In certain embodiments, the transceiver 66 may include only a transmitter circuit 76 or only a receiver circuit 78.

In certain embodiments, the transmitter circuit 76 may include a processor 80 (e.g., microcontroller, controller), a signal conditioner/amplifier 82, and a sensor system 84. Specifically, the transmitter circuit 76 may receive data from a component within the welding system 10 via the sensor system 84, generate a control signal based on the received data via the processor 80, and transmit the control signal across the weld cable 36, as further described in detail with respect to FIG. 3. In certain embodiments, the transmitter circuit 76 may remove noise and/or amplify the signal via the signal conditioner/amplifier 82 before transmitting the control signal across the weld cable 36.

In the illustrated embodiment, the sensor system 84 may include one or more sensors configured to monitor the movement of the welding torch 16. For example, in certain situations, the sensor system 84 is configured to measure one or more parameters of the welding torch 16 that are indicative of a position or a movement of the welding torch in the weld environment. To that end, the sensor system 84 may include one or more sensors (e.g., accelerometers) that measure the desired parameters continuously or at desired intervals throughout the weld operation. As the sensor system 84 acquires such data regarding the operational position of the welding torch 16, and the sensor information (e.g., positional data) is communicated to the processor 80. In certain embodiments, the sensor system 84 is configured to simply determine whether the welding torch 16 is active (e.g., moving, in use) or in a sleep mode, while in other embodiments, the sensor system 84 may be configured to gather position and orientation information (e.g., sensor information). Furthermore, the sensor system 84 may include one or more sensors configured to determine whether the trigger 62 of the welding torch 16 is actuated or released. In any of the situations presented above, the sensor system 84 may be configured to provide the gathered information as sensor information and/or sensor feedback information to the processor 80.

In certain embodiments, the sensor system 84 may include any type of sensor that is configured to gather and transmit position, orientation, rotation, movement, and/or location information of the welding torch 16 to the processor 80. For example, the sensor system 84 may include one or more accelerometers, inclinometer, motion detector, magnetometer, vibration sensor, optical sensor (e.g., camera, video camera) or any other form of tracking device. In certain embodiments, the accelerometer may be a single-axis or a multi-axis accelerometer that is configured to detect the magnitude and/or the direction of the welding torch 16. Further, in certain embodiments, a magnetoresistive sensor may be utilized to detect the same. Further, the sensor system 84 may additionally include any type of sensor that is configured to detect and transmit information related to the mechanical actuation and/or release of the trigger 62. For example, the sensor system 84 may include a mechanical sensor, tactile sensors, optical sensors, vibration sensors, or any other form of sensor configured to detect an actuation of a switch or trigger.

In certain embodiments, the receiver circuit 76 may include the processor 80, the signal conditioner/amplifier 82, and communications circuitry 86. The receiver circuit 78 of a separate transceiver 66 may function to receive the control signal transmitted by the transmitter circuit 76 via the weld cable 36, translate the received control signal into a particular data format or as another control signal via the processor 80, and send the corresponding data to another component in the welding system 10 via the communications circuitry 86, as further described in detail with respect to FIG. 4. In certain embodiments, the receiver circuit 78 may remove noise and/or amplify the signal via the signal conditioner/amplifier 82 before transmitting the control signal to the processor 80.

In certain embodiments, the processor 80 of the transmitter circuit 66 may be configured to receive the information gathered regarding the movement of the welding torch 16. Further, if the torch is not in the sleep mode, the processor 66 may be configured to monitor the trigger 62 to determine the status of the trigger 62 (e.g., actuated or released). If the trigger 62 is actuated, the processor 80 may be configured to transmit one or more control signals through the weld cable 36. In certain embodiments, the control signals from the sensor system 84 may indicate that the trigger 62 is actuated, and that the welding torch 16 is in operation for a welding application and utilizing various welding resources (e.g., gas, wire, welding voltage). If the trigger 62 is released, the processor 80 may not be configured to transmit any control signals through the weld cable 36. Accordingly, if the receiver circuit 78 does not receive any control signals to indicate that the trigger 62 is actuated, then the receiver circuit 78 may transmit information to a component of the welding system 10 indicating that various welding resources (e.g., gas, wire, welding voltage) may not be needed.

For example, in the illustrated embodiment, the control circuitry 44 of the wire feeder 14 may receive information from the receiver circuitry 78 related to an operating parameter of the welding torch 16. For example, the wire feeder 14 may receive information indicating that the welding torch 16 is in use and/or that the trigger 62 is actuated. In this situation, the wire feeder 14 may continue to provide the welding torch 16 with materials, such as wire. Alternatively, the wire feeder 14 may receive information from the receiver circuitry 78 indicating that the welding torch 16 is not in use and/or that the trigger 62 is released. In this situation, the wire feeder 16 may stop providing the welding torch with materials, such as the wire.

As further described in detail below, in certain embodiments, the control signals transmitted by the transmitter circuit 76 may be one or more modulated or unmodulated tones. Further, in other embodiments, the control signals transmitted by the transmitter circuit 76 may be transmitted through the tones, which may be configured as carrier channels. For example, the processor 80 of the transmitter circuit 76 is configured to transmit data communications utilizing one or more carrier channels or "tones." Specifically, the one or more tones may be described as sinusoidal signals that are transmitted by the transmitter circuit 76. In certain embodiments, the transmitter circuit 76 may transmit modulated tones and/or unmodulated tones. Modulated tones may be utilized to communicate (e.g., send/receive) data using one or more known techniques for modulating a signal for data transmission. For example, the transmitter circuit 76 may utilize phase-shift keying, bi-phase modulation, pulse position modulation, or any other modulation scheme. The modulated tones transmitted may include any type of information useful for the welding process or operation. For example, in some situations, the data transmitted by the transmitter circuit 76 may include information related to any welding parameter (e.g., weld voltage, wire speed, actuation of the trigger 62, release of the trigger 62) that is transmitted to the wire feeder 14 and/or the welding torch 16 for welding applications.

In some embodiments, the processor 80 of the transmitter circuit 76 may also transmit unmodulated tones (also known as "pilot tones") that do not carry data. Specifically, unmodulated tones may be sinusoidal signals that have predefined or known characteristics, such as a predefined amplitude, frequency, and/or phase. In particular, modulated tones may be distinguishable from unmodulated tones based on one or more such characteristics of the unmodulated tones, and based on the fact that unmodulated tones may not be modulated utilizing the one or more modulation schemes described above. In certain embodiments, the transmitter circuit 76 may transmit a plurality of tones, any number of which may be modulated or unmodulated. Further, the transmitter circuit 76 may be configured to transmit tones that are spaced a predetermined time period apart. Accordingly, the transmitter circuit 76 may be configured to transmit a series of tones in succession that are spaced a certain time period apart.

In certain embodiments, an orthogonal frequency-division multiplexing (OFDM) scheme may be utilized by the transmitter circuit 76 to transmit the modulated and unmodulated tones on multiple carrier frequencies (e.g., frequency-division multiplexing). For example, within the OFDM scheme, the transmitter circuit 76 may be configured to transmit the one or more tones over several parallel data stream or channels at a low modulation rate, thereby maintaining transmission characteristics that are similar to a single-carrier modulation scheme. In particular, the frequency-division multiplexing scheme may divide a single transmission medium having a particular total bandwidth into a series of non-overlapping frequency sub-bands that are each configured to carry a particular signal. In this manner, the single transmission medium (e.g., the weld cable 36) may be shared by multiple separate unmodulated or modulated tones.

FIG. 3 illustrates a flow chart of a method 90 for transmitting one or more control signals using the transmitter circuit 76 of the transceiver 66 of FIG. 2 based on an operating parameter of the welding system 10 of FIG. 1, in accordance with embodiments described herein. The method 90 begins with the transmitter circuit 76 monitoring the sensor system 84 for updates on the welding torch 16 (block 92). For example, the sensor system 84 may be configured to gather information related to the movement of the welding torch 16, such as if the welding torch 16 changes from a sleep mode to an active mode (e.g., in use). Furthermore, the sensor system 84 may also be configured to gather information related to the status of the trigger 62, such as if the trigger 62 of the welding torch 16 is actuated or released.

In particular, the sensor system 84 may be configured to provide the gathered sensor information gathered to the processor 80. Based on the information received from the sensor system 84, the method 90 further includes the processor 80 of the transmitter circuit 76 determining the status of the trigger 62 disposed within the welding torch 16 (block 94). Further, if the trigger 62 is actuated, the transmitter circuit 76 may be configured to transmit one or more control signals (block 96) through the weld cable 36 indicating that the trigger 62 is actuated and that the weld torch 16 is in use. If the trigger 62 is released or not actuated, the processor 80 of the transmitter circuit 76 may not transmit any control signals (block 98) through the weld cable 36. However, in certain embodiments, if the trigger 62 is not released or not actuated, the processor 80 of the transmitter circuit 76 may be configured to transmit one or more control signals having data that indicates that the trigger 62 is not actuated. For example, in such situations, the transmitter circuit 76 may be configured to transmit one or more modulated tones having data indicating that the trigger 62 is not actuated.

FIG. 4 illustrates a flow chart of a method 100 for controlling an operating parameter of the welding system 10 of FIG. 1 based on the one or more control signals received by a receiver circuit 78 of the transceiver 66 of FIG. 2, in accordance with embodiments described herein. The method 100 begins with the receiver circuit 78 receiving the one or more control signals transmitted by the transmitter circuit 76 through the weld cable 36 (block 102). Further, the method 100 includes determining the status of the trigger 62 (e.g., actuated, released) based on the received control signals or based on the lack of any control signals (block 104). For example, if the receiver circuit 78 does not receive any control signals, the trigger 62 may not be actuated. Likewise, if the receiver circuit 78 receives one or more control signals, the trigger 62 may be actuated. The method 100 includes the receiver circuit 78 relaying the status of the trigger 62 to a component of the welding system 10 (e.g., the welding power supply 12, the wire feeder 14, the welding torch 16) (block 106). In certain embodiments, the receiver circuit 78 may relay the status in another control signal through the weld cable 36, or may relay the information via one or more control cables. Further, the method 100 includes controlling the welding operating parameter based on the status of the trigger 62 (block 108). For example, in the illustrated embodiment, the wire feeder 16 may be configured to stop providing wire through the cable 54 if the trigger is determined to be released. Likewise, any component of the welding system 10 may change or control an operating parameter of the welding system (e.g., wire speed, welding voltage) based on the status of the switch.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
a weld torch coupled to a weld cable and configured to output wire from a wire feeder and produce a welding arc based on welding power received through the weld cable;
a sensor system comprising at least one sensor configured to detect sensor information related to a trigger status of the weld torch;
a first transmitting circuit coupled to the sensor system and configured to be directly coupled to a first cable coupler, wherein the first cable coupler configured to be directly coupled to a conductor of the weld cable along a length of the weld cable closer to the weld torch than the wire feeder, wherein the first transmitting circuit comprises a first processor configured to receive the sensor information and to transmit one or more control signals through the first cable coupler and the conductor of the weld cable based on the sensor information;
a first receiving circuit configured to be directly coupled to a second cable coupler, wherein the second cable coupler configured to be directly coupled to the conductor of the weld cable along a length of the weld cable closer to the wire feeder than the weld torch, wherein the first receiving circuit comprises a second processor configured to receive the one or more control signals from the first transmitting circuit through the second cable coupler and the conductor of the weld cable and to generate information related to the trigger status of the weld torch based on the one or more control signals;
the first cable coupler configured to removably couple the first transmitting circuit to the weld cable; and
the second cable coupler configured to removably couple the first receiving circuit to the weld cable, wherein the first cable coupler and the second cable coupler each comprise a mechanical clamp configured to attach around a surface of the weld cable; and
communications circuitry disposed within the first receiving circuit and configured to transmit the information related to the trigger status of the weld torch to the wire feeder, wherein the wire feeder is configured to control an operating parameter of the welding system based at least in part on the information related to the trigger status.

2. The welding system of claim 1, wherein the sensor system is configured to detect sensor information related to a position, an orientation, a rotation, a movement, or a location of the weld torch.

3. The welding system of claim 1, comprising a trigger on the weld torch that is actuated or released by an operator, and wherein the sensor system is configured to detect sensor information related to an actuation or a release of the trigger on the weld torch.

4. The welding system of claim 3, wherein an actuated trigger on the weld torch indicates that the weld torch is being utilized to output wire from the wire feeder and to produce the welding arc.

5. The welding system of claim 3, wherein a released trigger on the weld torch indicates that the weld torch is not being utilized to output wire from the wire feeder or to produce the welding arc.

6. The welding system of claim 3, wherein the first processor is configured to transmit the one or more control signals if the sensor system detects that the trigger on the weld torch has been actuated.

7. The welding system of claim 3, wherein the first processor is configured to stop transmitting the one or more control signals if the sensor system detects that the trigger on the weld torch has been released.

8. The welding system of claim 1, wherein the one or more control signals transmitted by the first processor comprise one or more modulated and unmodulated tones.

9. The welding system of claim 8, wherein a transmitted modulated tone is a complex sinusoidal signal utilized to send data related to an actuation or a release of a trigger on the weld torch.

10. A system for communicating between at least two components of a welding system; comprising:
- a transmitter circuit configured to be directly coupled to a cable coupler, wherein the cable coupler configured to be directly coupled to a conductor of a weld cable along a length of the weld cable, wherein the conductor of the weld cable is configured to supply power to a weld torch, wherein the transmitter circuit comprises:
  - a sensor system configured to detect sensor feedback, information related to a trigger status of nail the weld torch; and
  - a first processor configured to generate one or more control signals based on the sensor feedback information received from the sensor system, and to transmit the one or more control signals through the cable coupler and the conductor of the weld cable;
- a receiver circuit configured to be disposed within a wire feeder, wherein the receiver circuit comprises:
- a second processor configured to receive the one or more control signals through the conductor of the weld cable, and to determine the trigger status of the weld torch based on the one or more control signals; and
- communications circuitry configured to transmit the trigger status to a wire feeder control circuitry, wherein the wire feeder control circuitry is configured to control an operating parameter of the welding system based at least in part on the trigger status; and
- the cable coupler comprising a mechanical clamp configured to attach around a surface of the weld cable, the cable coupler configured to removably couple the transmitter circuit to the weld cable.

11. The system of claim 10, wherein the second processor is configured to determine if a trigger disposed on the weld torch is actuated, and wherein an actuated trigger on the weld torch indicates that the weld torch is being utilized to output wire from the wire feeder and to produce a welding arc.

12. The system of claim 10, wherein the second processor is configured to determine if a trigger disposed on the weld torch is released, and wherein a released trigger on the weld torch indicates that the weld torch is not being utilized to output wire from the wire feeder or to produce a welding arc.

13. The system of claim 10, wherein the wire feeder control circuitry is configured to control an operating parameter related to a wire feed speed of the wire feeder.

14. The system of claim 10, wherein the sensor system comprises a motion sensor configured to detect a movement of the weld torch from a sleep mode to an active mode.

15. The system of claim 14, wherein the motion sensor comprises an accelerometer, a rate sensor, a magnetometer, or a combination thereof.

16. The system of claim 10, wherein the mechanical clamp has an inner diameter that matches an outer diameter of the weld cable.

\* \* \* \* \*